T. W. ROUNDS.
Apparatus for Manufacture of Bayonet-Scabbards.
No. 165,952. Patented July 27, 1875.
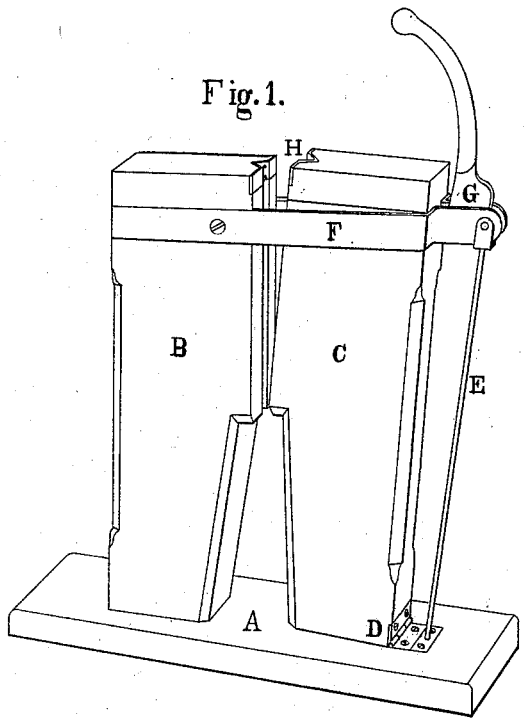
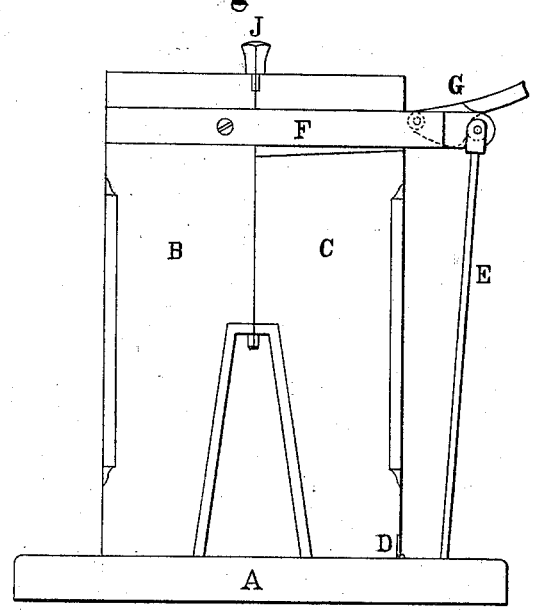
Fig. 3.
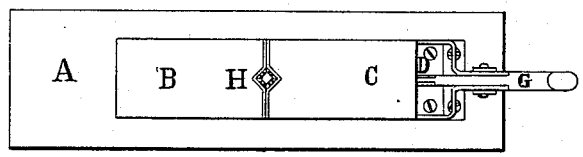
Fig. 4.
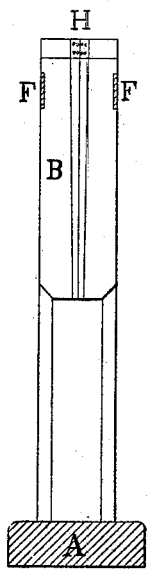
WITNESSES:
INVENTOR:
Thomas W. Rounds

UNITED STATES PATENT OFFICE.

THOMAS W. ROUNDS, OF PROVIDENCE, RHODE ISLAND, ASSIGNOR OF ONE-HALF HIS RIGHT TO JOHN B. HUMPHREYS, OF SAME PLACE.

IMPROVEMENT IN APPARATUS FOR THE MANUFACTURE OF BAYONET-SCABBARDS.

Specification forming part of Letters Patent No. 165,952, dated July 27, 1875; application filed May 1, 1875.

CASE No. 1.

*To all whom it may concern:*

Be it known that I, THOMAS W. ROUNDS, of the city and county of Providence, in the State of Rhode Island, have invented an Improvement in Apparatus for use in the Manufacture of Bayonet-Scabbards and analogous articles, of which the following is a specification.

The object of this invention is to provide machinery which shall facilitate the construction of sheaths or scabbards formed of leather or other suitable material, whereby uniformity of shape is secured, together with perfection of finish and rapidity of production.

Figure 1 is a perspective elevation of my machine. Fig. 2 is a side elevation; Fig. 3, a plan view, and Fig. 4 a transverse section.

Similar letters indicate corresponding parts in all the figures.

A is the base upon which the machine stands; B and C, upright jaws erected thereon, the one, B, being, by preference, firmly secured thereto, and the other, C, attached by a hinge, D, or otherwise, so as to be movable toward and away from the fixed jaw B, for a purpose hereinafter described.

From the base A is also erected the rod E, attached at its upper end to the stout band F, which encircles the jaws B and C, and forming a pivot for the cam G. This band and cam serve to bring and hold in close contact the jaws B and C; or, by retracting the lever on the cam, the jaw C is separated from its fellow by a movement on its hinge, effected by a spring or other suitable means.

The machine shown in the drawings connected with this application is calculated for holding bayonet-scabbards, &c., for forming them inside.

With this view there is formed on the perpendicular face of each of the jaws a long tapering groove, (seen at H, Figs. 1 and 4,) the corners of which form right angles and have equal sides, so that when the face of the jaws B and C are abutted together these grooves will coincide and leave the opening square in its section, as shown at H in Fig. 3, and decreasing gradually from top to bottom. This tapering groove is faced with vulcanized rubber the entire length of the jaws, and a portion of the face of each of these jaws, at the top, is also faced with plate metal, provided with teeth for holding the scabbard on the outside while its inside is being formed. This combination of material forms an elastic and effective material admirably adapted to my purpose.

I also form a plunger, J, of a shape to correspond with that of the quadrangular groove H of the holding-machine, but somewhat smaller in horizontal section, so as leave space between them, for the material of which the scabbard is composed when the same is placed within the jaws and the plunger inserted therein.

The operation of the machine is as follows: The jaws being opened by retracting the cam-lever G, the plunger J is partially introduced into the unformed scabbard, and both are placed between the jaws, which, closing, form the holder. The plunger is then driven home by heavy blows, or by such other adequate means as may be most convenient or effective, and so producing a most permanent and perfect shape and finish on the inside of the scabbard. The jaws may then be opened and the operation repeated.

I do not deem it necessary here to describe further the process of forming and finishing the scabbards, such description being given more fully in an application of even date herewith for a patent on the product in part of this machine.

Having thus described my invention, I claim—

1. The combination of the jaws B and C with the recess H, the plunger J, and the compressing means F and G, substantially as and for the purposes specified.

2. In combination with the grooved jaws B and C, the metallic-faced plate H, having a toothed, serrated, or roughened surface, for seizing the scabbard on the outside, and holding it securely while being formed on the inside, substantially as and for the purposes set forth.

THOMAS W. ROUNDS.

Witnesses:
 E. F. CASE,
 JOHN B. HUMPHREYS.